Figure 1:
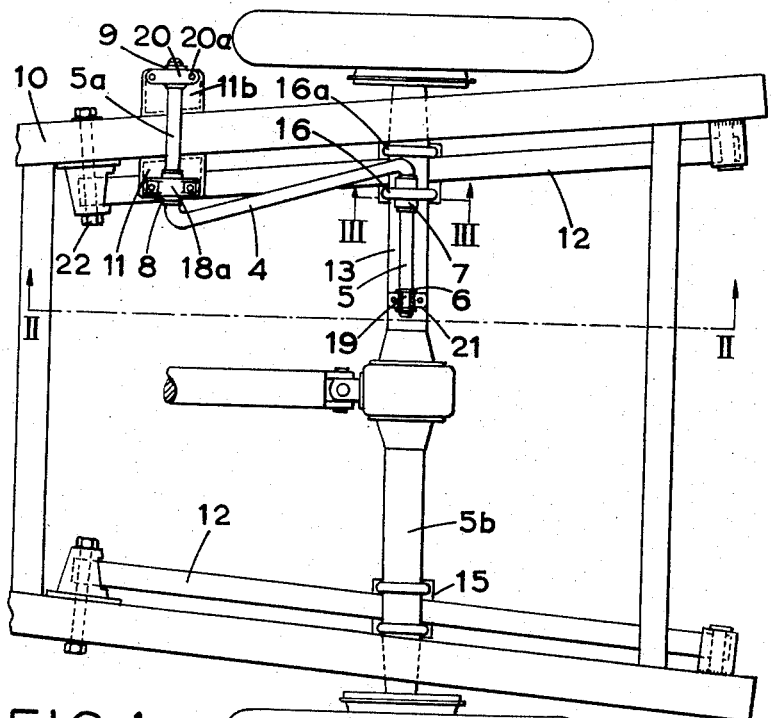

July 15, 1958 G. BASTOW 2,843,397
MOTOR VEHICLE SUSPENSION WITH REAR AXLE ANTI-ROLL ROD
Filed April 12, 1956 2 Sheets-Sheet 1

INVENTOR
Geoffrey Bastow
BY
Leech and Radue
ATTORNEYS

July 15, 1958 G. BASTOW 2,843,397
MOTOR VEHICLE SUSPENSION WITH REAR AXLE ANTI-ROLL ROD
Filed April 12, 1956 2 Sheets-Sheet 2

INVENTOR
Geoffrey Bastow
BY
Suchand Radus
ATTORNEYS

United States Patent Office 2,843,397
Patented July 15, 1958

2,843,397

MOTOR VEHICLE SUSPENSION WITH REAR AXLE ANTI-ROLL ROD

Geoffrey Bastow, Alsager, Stoke-on-Trent, England, assignor to Rolls-Royce Limited, Derby, England, a British company Application April 12, 1956, Serial No. 577,822

Claims priority, application Great Britain April 15, 1955

7 Claims. (Cl. 280—124)

This invention relates to the suspension of motor vehicles and applies particularly to a motor vehicle of which the rear axle is solid. In using the expression a solid rear axle it is meant that the shafts driving the rear wheels are mounted in a solid axle tube and are supported from the frame on leaf springs of the type commonly referred to as "semi-elliptical." The frame may be either a chassis frame to which the body is secured or itself form part of the body. The rear of the frame is normally formed as a bow across which the leaf springs extend. The axle is secured to the leaf springs and rests at or near the centre of the top leaf.

It is known in such a construction to fit an anti-roll rod which consists of a rod having considerable torsional resistance which extends across the rear of the chassis and is connected at its ends adjacent the wheels by levers or the like through which a vertical oscillation of one wheel relative to the other will place a torsional strain on the rod to cause the same to resist such movement.

The object of such a rod is to avoid rolling of the body and chassis on the wheels which besides being uncomfortable to the passengers may cause a "steering" effect due to movement of the rear axle in plan view due to the difference in the effective lengths of the front halves of the two rear leaf springs and this may add to or detract from the steering normally applied through the front wheels.

The best position for a rear anti-roll rod is forward of the rear axle. This involves its passage across the vehicle and it has normally to be curved upwards at the centre to clear the propeller shaft or rear universal joint, or perhaps the pinion housing of the axle casing. Such curvature introduces bending stresses in the rod in the neighbourhood of the curves, and hinders the designer in selecting the best diameter of spring steel for the roll-rod usually involving a heavier section than would be required with a straight rod, and also the acceptance of localised stresses in the rod near the curves.

This invention has for one of its objects an anti-roll rod for use in conjunction with a solid rear axle which can be located entirely on one side of the propeller shaft.

Another object of the invention is to control the "shake" which is produced by rocking of the axle in side elevation on the springs. (The springs "wind up" a small amount alternately in each direction when this occurs.)

A subsidiary object of this invention is to use the anti-roll rod to inhibit movement of the axle due to the effect upon it of driving or braking torques which will or may result in small rotary movements of the axle due to "wind up" of the springs.

According to this invention I provide a metal rod of high torsional resistance which has a portion of substantial length articulated at two points to the rear axle and parallel therewith, a second portion at an angle to the first portion and forwardly projecting therefrom and a third portion at an angle to the second portion, parallel with the rear axle and articulated at two separated points to the vehicle frame.

Preferably all the articulations are in rubber bushes which permit whilst resisting rotational movement but inhibit axial movement in the bushes. In using the term "rubber" I include rubber, natural and synthetic and substitutes therefor.

Preferably the forward articulation is close to the forward eye of one of the leaf springs and the rod and front half of the leaf spring form a parallel motion device.

Preferably the rod is articulated along the top of the axle and as far above the spring as possible.

Figure 2:
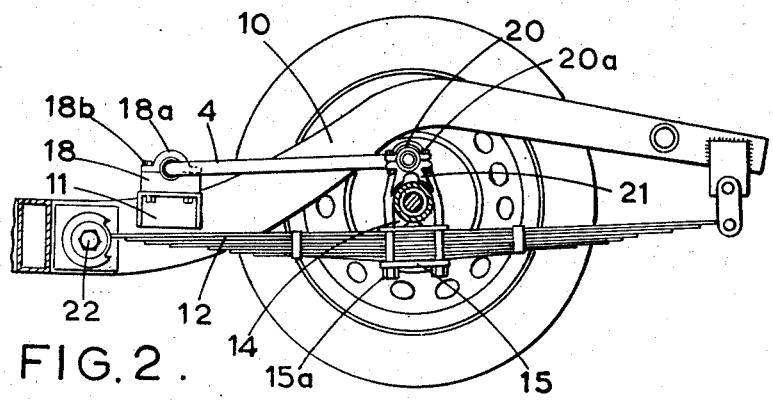
Figure 3:
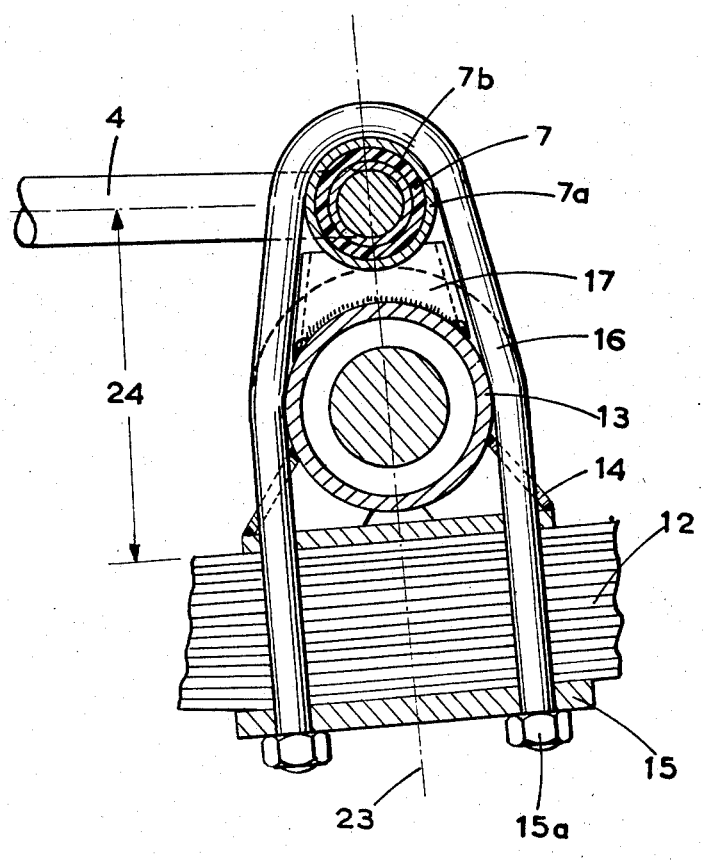

An example of this invention is illustrated in the accompanying drawings in which:

Figure 1 is a plan view of the rear end of the chassis,
Figure 2 is an elevation of Figure 1 on the line II—II,
Figure 3 is a section on the line III—III of part of the members shown in Figure 1 to an enlarged scale.

A rod of steel having a high torsional resistance and being in the shape of a letter Z is mounted in four rubber bushes, two at each end of its parallel arms 5 and 5a. The rear portion of the rod is above and parallel to the rear axle tube 5b on which it is mounted by rubber bushes 6 and 7, and the front portion is mounted by rubber bushes 8 and 9, on the frame side member 10 by brackets 11 and 11b welded to the frame. The rubber of these bushes is in compression and permits partial rotary movement of the rod arms by distortion—but not sliding—of the rubber, in well-known manner. The more heavily loaded of these bushes, namely 7 and 8, are larger than the others and the rubber 7 (see Figure 3) is held compressed by a steel sleeve 7a and an inner steel sleeve 7b. The latter is a drive fit on the rod.

The road springs 12 are secured to the axle tubes 13 by the usual U-bolts 16 and 16a, saddle pieces 14 welded to the tubes and plates 15 with nuts 15a. One of the U-bolts 16 is longer than the others and is utilised to secure the bush 7 by being passed over it and holding it rigidly into the saddle piece 17 also welded to the axle.

The bush 8 which is the same as bush 7 is tightly held in a bracket 18 by a cap 18a and bolts 18b which latter also secure bracket 18 to frame bracket 11.

The smaller bushes 6 and 9 are plain rubber bushes compressed into reduced portions 19 at the extremities of the rod portions 5 and 5a by caps 20 and bolts 20a.

A special saddle bracket 21 is welded to the axle tube for the reception of the bush 6 and a bracket similar to bracket 18 is bolted to frame bracket 11b to receive bush 9.

The length of the Z-bar and the axes of oscillation of the arms 5 are carefully selected relative to the axis of the rear axle and that of the spring eye 22 so that under spring deflection the axle can only move along a path dictated by the geometry of the centre part of rod 4 and the front half of spring 12, and cannot move substantially in a rotary sense.

In other words the radius described by the rear end of the Z-bar and that described by the axle center under spring deflection are substantially the same. As a result, the axle, front half of the spring and Z-bar form a "parallel motion" device and resist rotary displacement of the axle under torque stresses.

Any tendency of the car frame and body to roll is resisted by the torsional stiffness of the middle portion of rod 4, and this is achieved by a rod entirely on one side of the propeller shaft.

It is only necessary to fit a rod on one side of the chassis though rods could be fitted on both sides if desired.

The angles of the Z are not critical.

Bearing 7 and 8 are preferably substantially in alignment in plan view to reduce bearing loading.

Bearing loads are further reduced by wide spacing of bearings 6 and 7, and 8 and 9 respectively, along the axle axis and across the frame side member. Also it is preferable—from similar considerations—to separate the axis of the bar 4 from that of the main leaf of the spring, a reasonable distance as shown at 24 in Figure 3.

What I claim is:

1. Suspension means for the rear wheels of a vehicle in which the wheels are carried at the ends of a solid transverse axle supported from a frame having side girders on fore and aft leaf springs of the semi-elliptic type having forward eyes, which suspension includes, in combination, a metal rod of high torsional resistance having a first portion of substantial length, means articulating said portion at two transversely separated points to the rear axle and parallel therewith, a second portion at an angle to the first portion and forwardly projecting therefrom, in substantial horizontal parallelism to the adjacent leaf spring, and a third portion at an angle to the second portion, parallel with the rear axle and means articulating said third portion at two transversely separated points substantially to the vehicle frame.

2. The combination recited in claim 1 in which the means articulating the rod are rubber bushes mounted to resist rod rotational movement, and means inhibiting axial movement of the rod portions in the bushes.

3. Suspension means as claimed in claim 1 the rod being articulated along the top of the axle.

4. Suspension means as claimed in claim 3 in which the axle is supported on top of the leaf springs, the forward articulations of the rod lie in a transverse vertical plane close to that in which lies the forward eye of one of the leaf springs and the second portion of the rod and the portion in front of the axle of that leaf spring form a parallel motion device.

5. Suspension means as claimed in claim 4 in which the rod when viewed in plan is in the shape of the letter Z.

6. Suspension means as claimed in claim 5, one of the parallel arms of the Z lying on top of the axle making an angle with the forward projecting part on the inside of and close to the side girder of the vehicle frame and the other parallel arm of the Z lying above and across the said side girder, said means articulating said last mentioned parallel arm being mounted on a member carried by said girder, the two articulations being on opposite sides of the said side girder.

7. Suspension means as claimed in claim 6 in which said last mentioned means supports the forward projecting part of the rod a substantial distance above the leaf spring.

References Cited in the file of this patent
UNITED STATES PATENTS
2,236,410    Leighton --------------- Mar. 25, 1941